United States Patent
Bender

(10) Patent No.: US 12,478,814 B2
(45) Date of Patent: Nov. 25, 2025

(54) FLAME TRAP

(71) Applicant: Witt GmbH & Co. Holding und Handels-KG, Witten (DE)

(72) Inventor: Martin Bender, Dortmund (DE)

(73) Assignee: Witt GmbH & Co. Holding und Handels-KG, Witten (DE)

( * ) Notice: Subject to any disclaimer, the term of this patent is extended or adjusted under 35 U.S.C. 154(b) by 396 days.

(21) Appl. No.: 18/013,676

(22) PCT Filed: Jul. 1, 2021

(86) PCT No.: PCT/EP2021/068220
§ 371 (c)(1),
(2) Date: Dec. 29, 2022

(87) PCT Pub. No.: WO2022/003123
PCT Pub. Date: Jan. 6, 2022

(65) Prior Publication Data
US 2023/0364456 A1    Nov. 16, 2023

(30) Foreign Application Priority Data
Jul. 1, 2020 (EP) .................................... 20183483

(51) Int. Cl.
*A62C 4/02* (2006.01)
*A62C 37/50* (2006.01)

(52) U.S. Cl.
CPC ............ *A62C 4/02* (2013.01); *A62C 37/50* (2013.01)

(58) Field of Classification Search
CPC .................. A62C 4/02; A62C 37/50
USPC ........................................................ 431/346
See application file for complete search history.

(56) References Cited

U.S. PATENT DOCUMENTS

| | | | |
|---|---|---|---|
| 6,172,428 B1 * | 1/2001 | Jordan | H02P 9/04 290/40 C |
| 2007/0089489 A1 * | 4/2007 | Lewnard | B01D 65/102 73/40 |
| 2014/0030666 A1 * | 1/2014 | Pryor | F23D 14/465 431/354 |
| 2022/0087535 A1 * | 3/2022 | Wong | G01K 13/20 |

FOREIGN PATENT DOCUMENTS

| | | | |
|---|---|---|---|
| DE | 2920397 A1 | 4/1981 | |
| FR | 2839769 A1 * | 11/2003 | ............... A62C 4/02 |

OTHER PUBLICATIONS

PCT International Search Report from PCT Application No. PCT/EP2021/068220; mailed Oct. 4, 2021; 9 pp.
English Translation of PCT International Search Report from PCT Application No. PCT/EP2021/068220; mailed Oct. 4, 2021; 1 pp.

* cited by examiner

*Primary Examiner* — Vivek K Shirsat
(74) *Attorney, Agent, or Firm* — Adams & Reese LLP; John Henry Scott, III

(57) ABSTRACT

Device (1) for preventing flashback in a pipe carrying a flammable gas, more particularly a flame trap, wherein the device (1) has a housing (8), with at least one onward flow barrier (9) disposed therein, at least one gas non-return valve (10) disposed therein and at least one sintered body (11) disposed therein, wherein the device (1) comprises a sensor device (2), wherein the sensor device (2) captures and stores data such as the frequency and intensity of flashbacks.

20 Claims, 21 Drawing Sheets

FLAME TRAP

Figure 1:
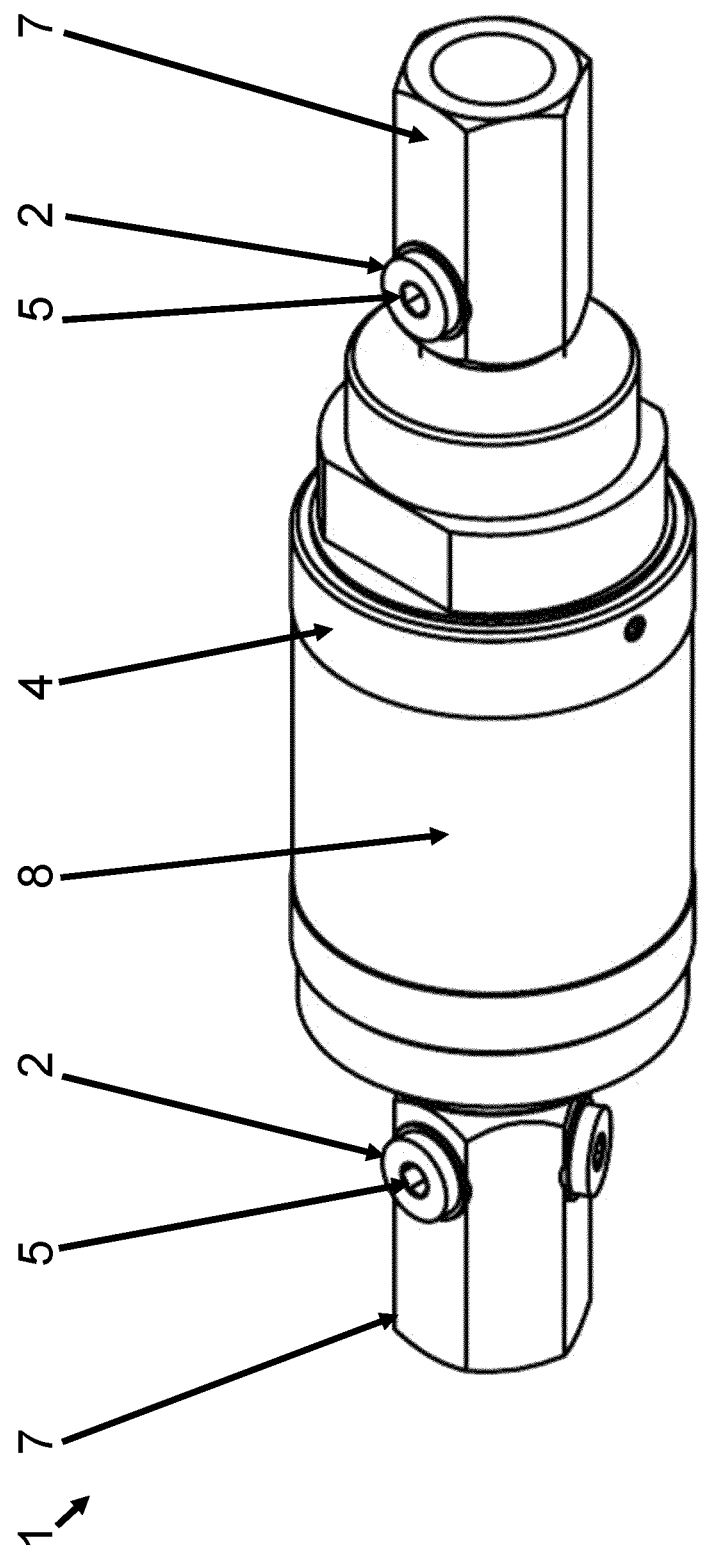

The invention relates to a device for preventing flashback in a pipe carrying a flammable gas, more particularly a flame trap, wherein the device has a housing, with at least one onward flow barrier disposed therein, at least one gas non-return valve disposed therein and at least one sintered body disposed therein, wherein the device comprises a sensor device.

Such devices have been known for a long time and are regularly used, especially in the field of gas engineering. These are simple flame traps that prevent flashback into a line carrying flammable gas and thus prevent an explosion of a gas storage tank connected to the line. Devices of this type are often mandatory for this reason, especially for accident prevention.

In practice, it has been found to be disadvantageous that it often goes unnoticed when the device responds or a flashback occurs. However, such a response of the device indicates a fault, in particular in the gas system or process. Flashbacks occur, for example, during welding when the torches used are faulty. However, these errors should be identified at an early stage.

It is therefore the object of the invention to provide a device that eliminates the described disadvantages and enables simple failure analysis.

This object is achieved by a device with the features of claim 1.

Because the sensor device captures and stores data such as the frequency and intensity of flashbacks, the device's response to a flashback can be more easily captured and considered in failure analysis. In particular, storing the frequency and intensity of flashbacks helps in subsequent failure analysis. Thus, the frequency and intensity of flashbacks can be easily logged, i.e., recorded and documented.

Advantageous embodiments and developments of the invention are subject of the dependent claims. It should be noted that the features listed individually in the claims can also be combined with one another in any desired and technologically useful manner, thus disclosing further embodiments of the invention.

According to an advantageous design of the invention, it is provided that the sensor device has at least one sensor designed as a temperature sensor, pulse sensor, sound sensor, pressure sensor and/or piezoelectric element. Such a sensor makes it particularly easy to capture the frequency and intensity of flashbacks. A piezoelectric element is particularly suitable for this purpose, as it responds very well to sudden pressure changes at the output of the device. This makes it easy to detect a pressure surge, pressure fluctuation, or pressure wave during a flashback via the piezoelectric element. Preferably, a piezoelectric element of the type EPZ-15MS60W from Elektrotechnik Karl-Heinz Mauz GmbH (Germany) is used. A sound sensor provides the option of detecting a flashback, which is accompanied by a short, soft popping or clicking sound. A magnetic sound sensor is particularly suitable for this purpose. In addition, pressure sensors whose transient measurement signal is analyzed are particularly suitable for detecting a short-term increase in pressure. The pressure sensor can also be used to easily measure the pressure in the line carrying the combustible gas for other purposes. A temperature sensor can also be used to detect a slowly continuing gas backfire on the basis of a temperature rise. Such a temperature sensor can advantageously be used in addition to the sensor detecting the flashback, as a flashback is detected by a temperature rise in the device independently of a flashback. A pulse sensor can be used to detect the pulse generated by the flashback.

It is further advantageous that the sensor device transmits the captured and/or stored data by means of an interface. This allows information on flashbacks that have occurred and their frequency to be output by means of a data stream, which greatly simplifies subsequent fault analysis.

It is further advantageous that the interface has a light-emitting diode. With this light-emitting diode, which can also serve as an indicator for occurred flashbacks, it is possible to read out information such as occurred flashbacks and their frequency by means of a modeled data stream. The use of the light-emitting diode as an interface also offers advantages in terms of the device's susceptibility to faults, as the light-emitting diode is not susceptible to external impacts such as moisture and dirt. A light-emitting diode can be used to easily indicate flashbacks that have occurred, making it easy to signal to the user that a reset of the device is required.

It is advantageous that the interface has a photoelement. This photoelement can be used to transfer data from an external device to the device. With this provided data the memory of the device can be reset and a change of the configuration of the device can also be made.

It is a particular advantage that the interface communicates with an external device, in particular a tablet or smartphone. This possibility greatly facilitates failure analysis, as acquired and stored data can be easily transferred from the device to an external device. Furthermore, the external device can be used in a very simple manner to reset the memory of the device or to make a change to the configuration.

A preferred embodiment of the invention provides that the interface communicates with a cloud service. This possibility greatly facilitates failure analysis, as acquired and stored data can be easily transferred from the device to a cloud and flexibly retrieved from there.

In a particularly advantageous design, it is provided that the interface is designed as a mesh component and can be integrated into a mesh network. This allows a wireless local mesh network to be formed from several WLAN components which, by connecting and jointly controlling the components (base and satellites), is seen as a uniform WLAN by the terminal devices located in the "mesh area" and ensures reception over as wide an area as possible at a constant transmission speed.

An advantageous embodiment of the invention provides that the sensor device is arranged in an adapter ring. The arrangement of the sensor device in such an additional element provides the advantage that the sensor device can be simply added onto the housing. Thus, the adapter ring can be simply coupled to the housing. Preferably, the adapter ring can be screwed to the housing by means of a thread. Preferably, a plurality of adapter rings can also be connected to the housing.

A further advantageous embodiment of the invention provides that the sensor device is arranged in the housing. The arrangement of the sensor device in the housing provides the advantage that this can be simply mounted with the housing and thus errors when mounting the device can be reduced.

A preferred embodiment of the invention provides that the device has a flowmeter that is designed to monitor the permeability of the sintered body. The highly porous structure of the sintered body ensures that incoming flames branch out in a labyrinth of pores, lose their energy and cool down so that the flame is extinguished. The flowmeter of the device can now be used to monitor the permeability of the highly porous structure to identify clogging of the sintered body with foreign matter.

Figure 2:
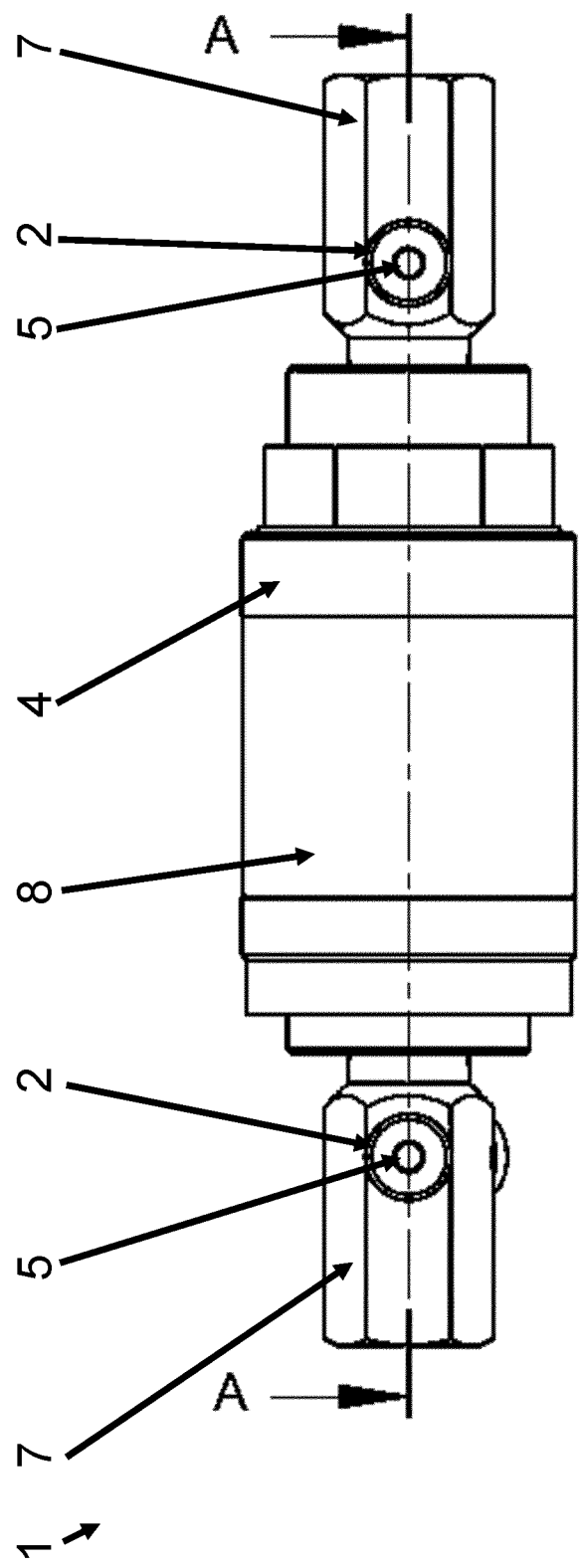
Figure 3:
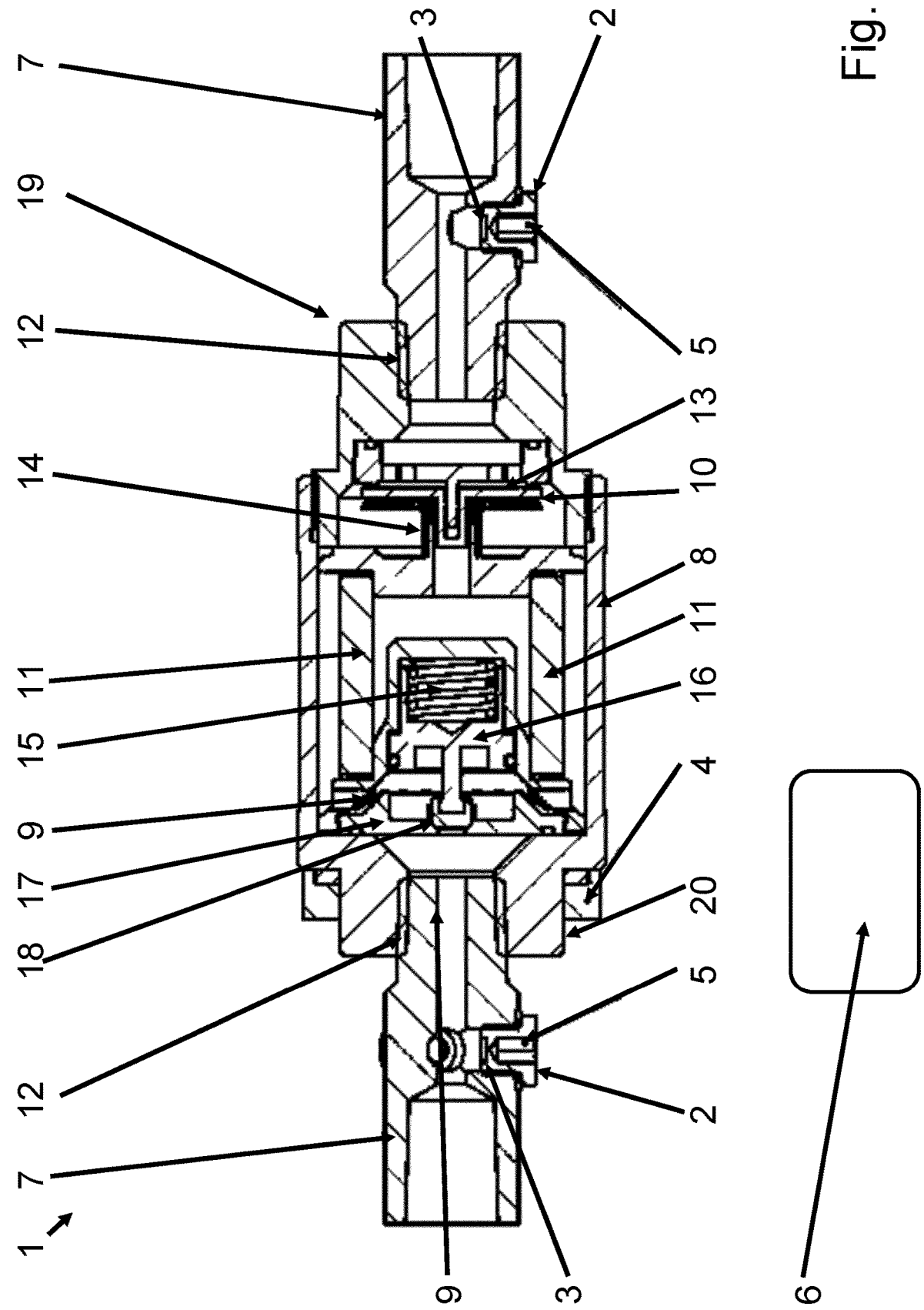
Figure 4:
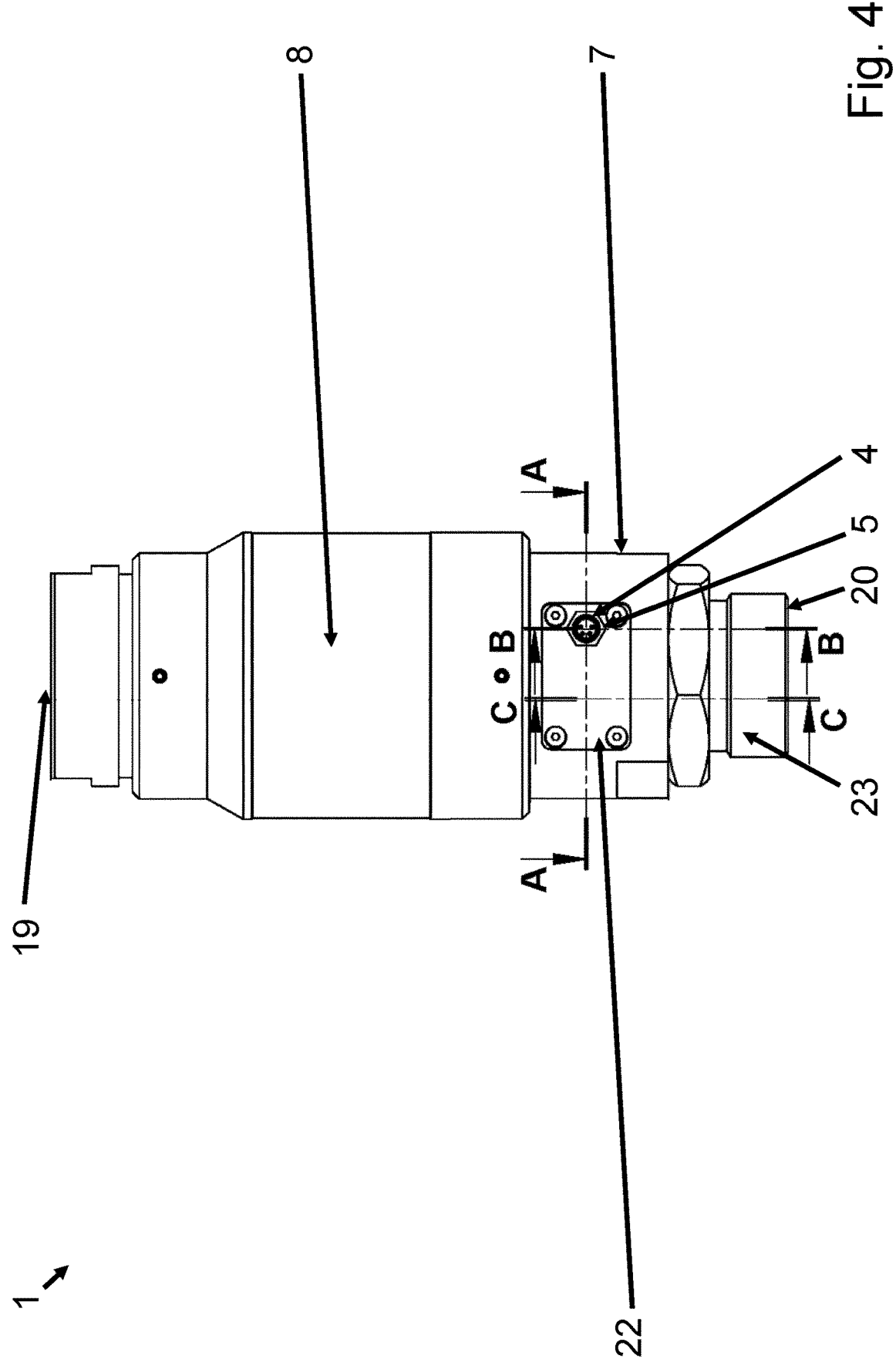
Figure 5:
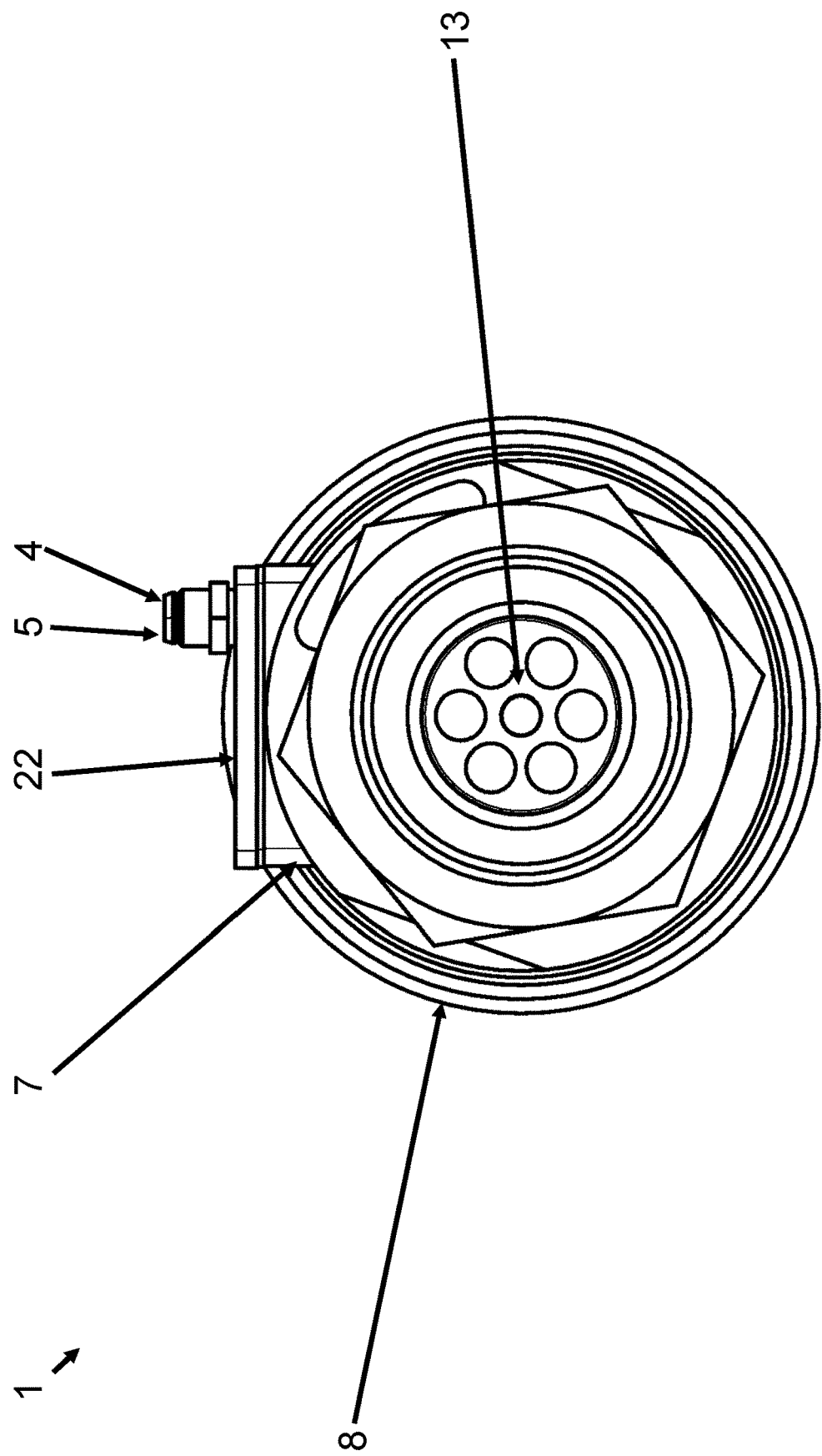
Figure 6:
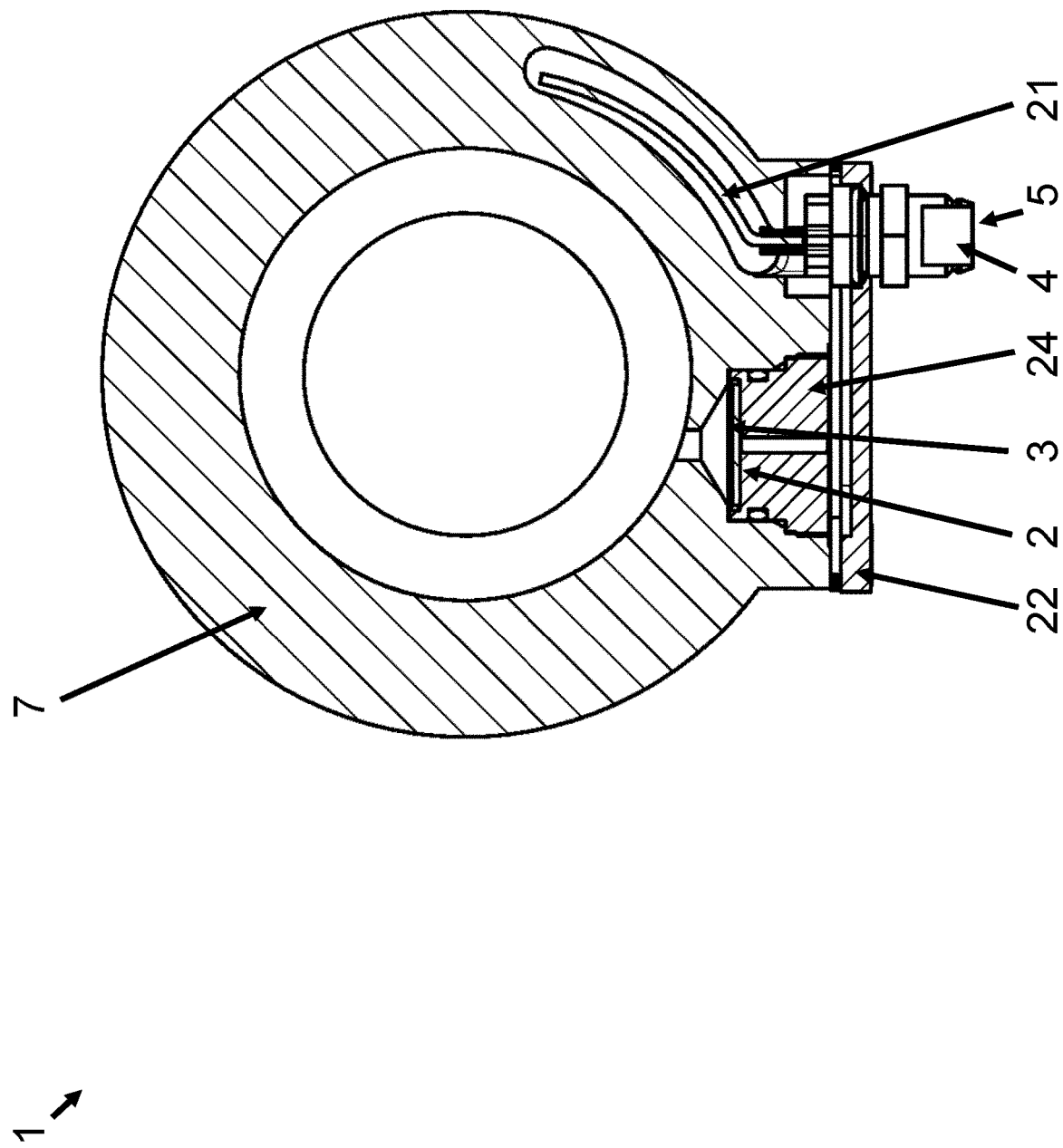
Figure 7:
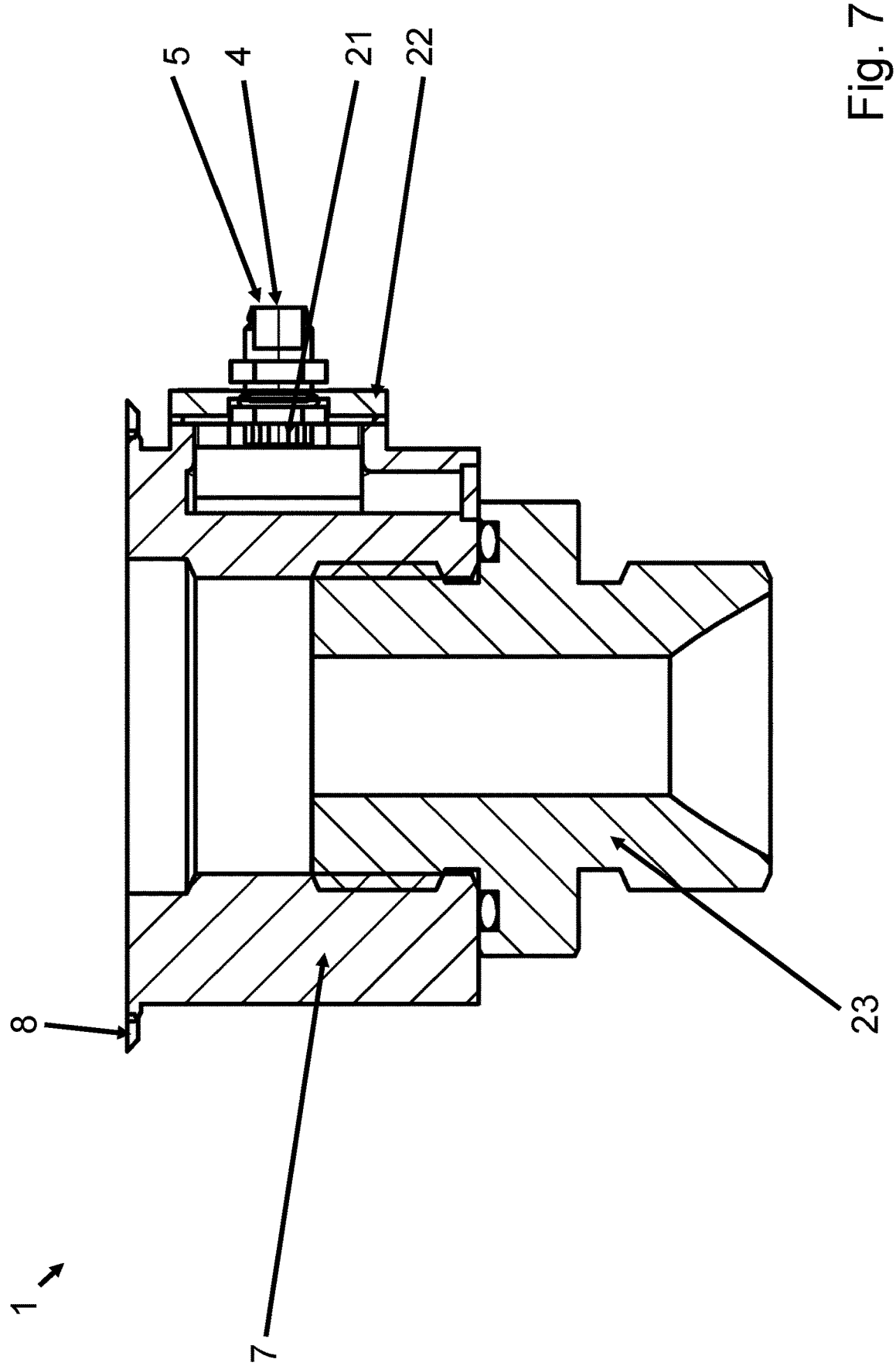
Figure 8:
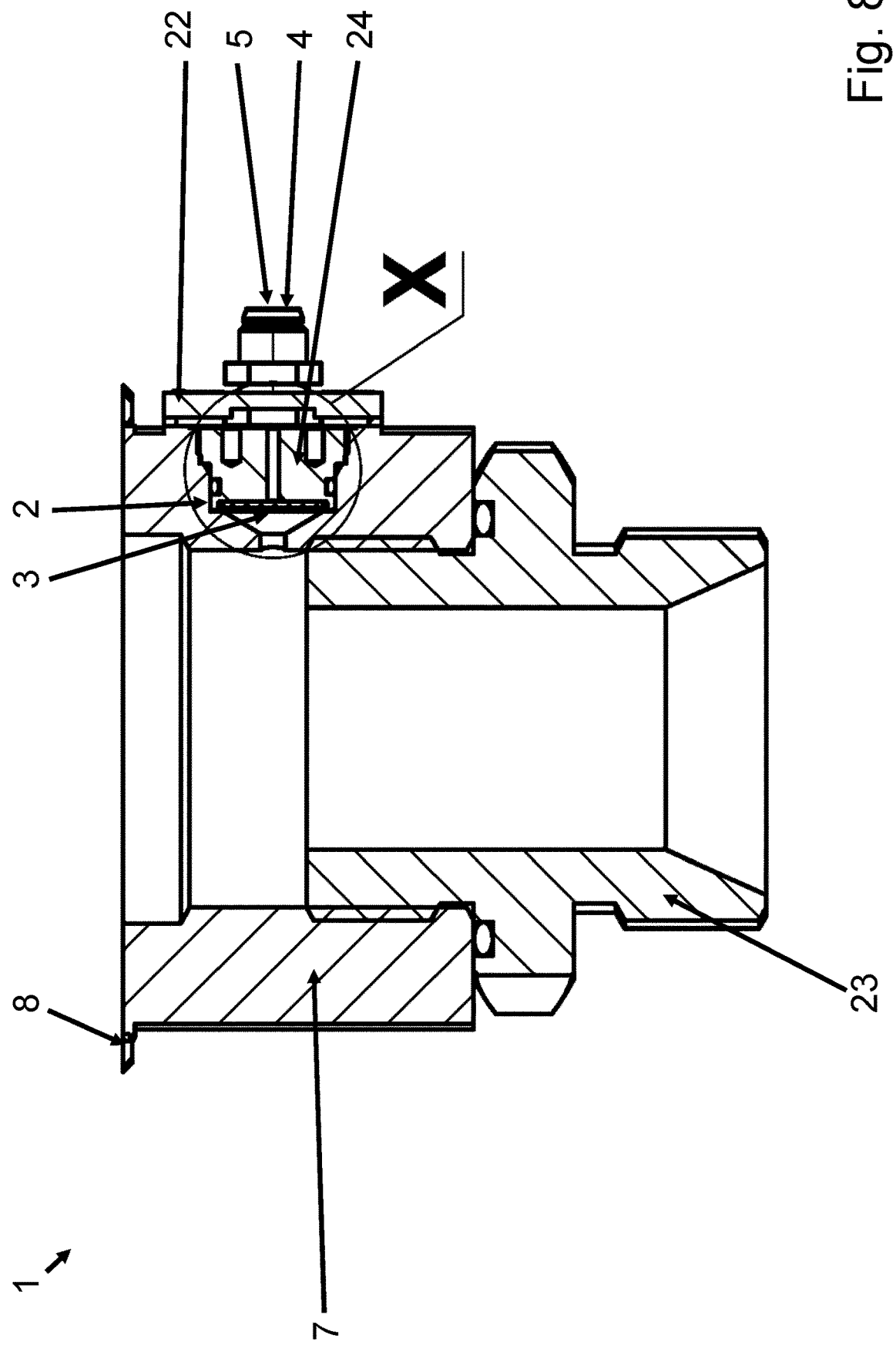
Figure 9:
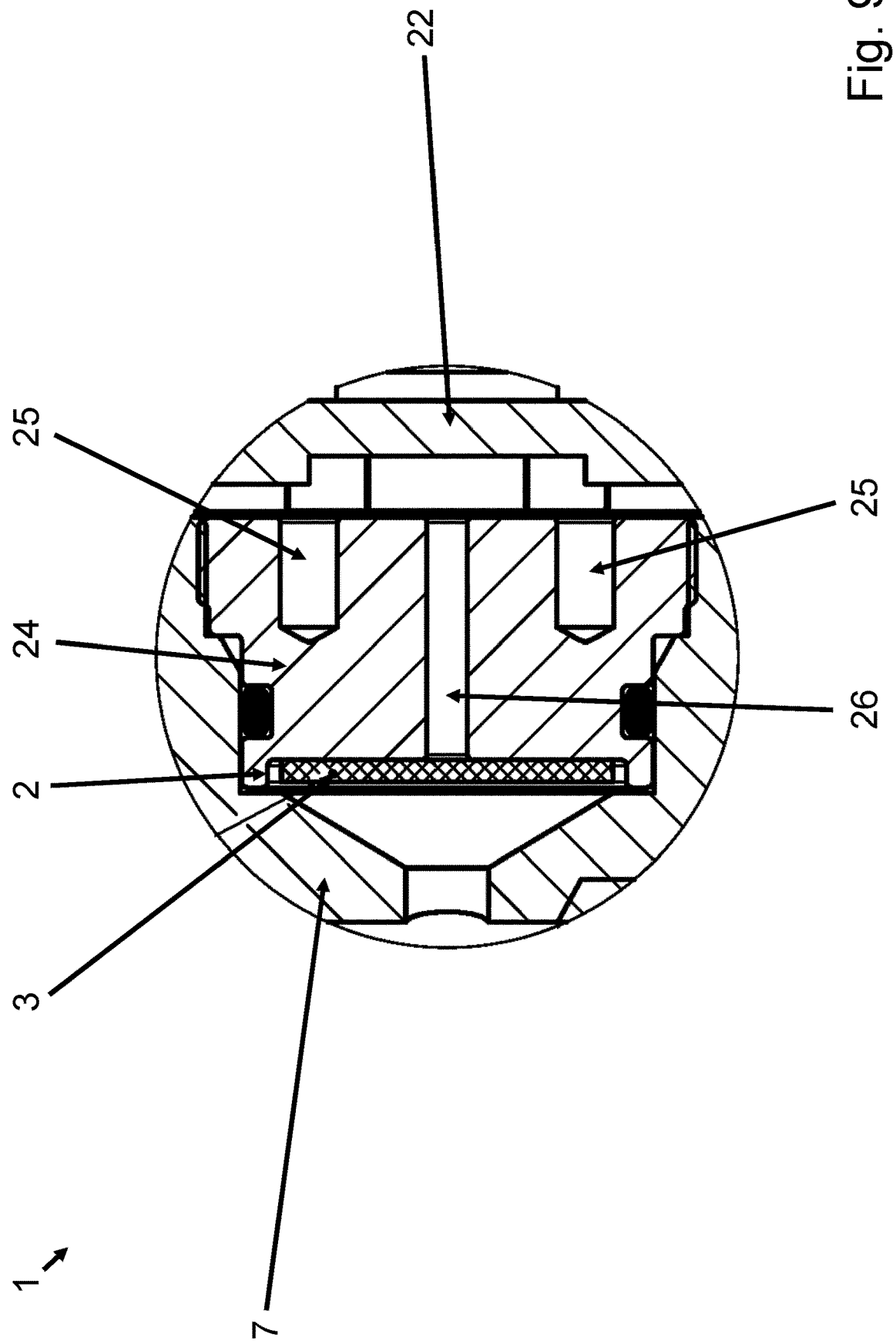
Figure 10:
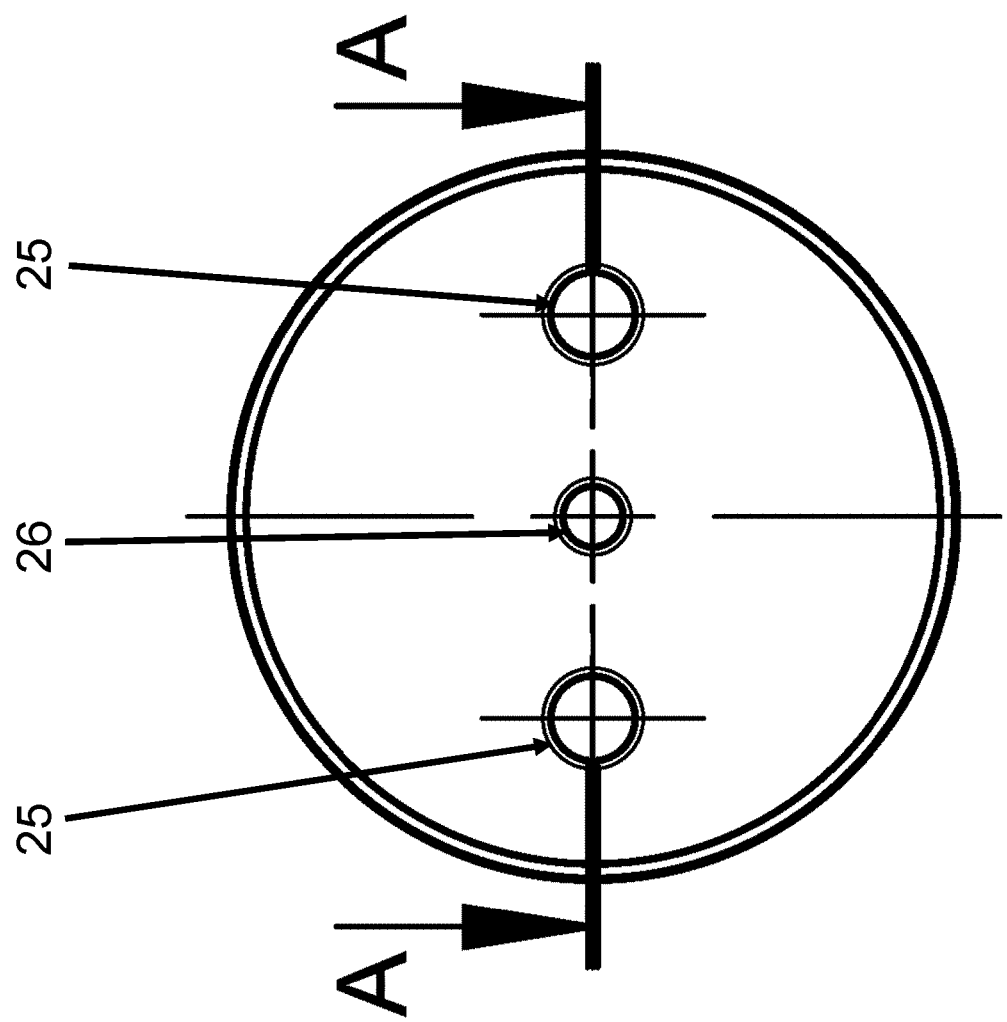
Figure 11:
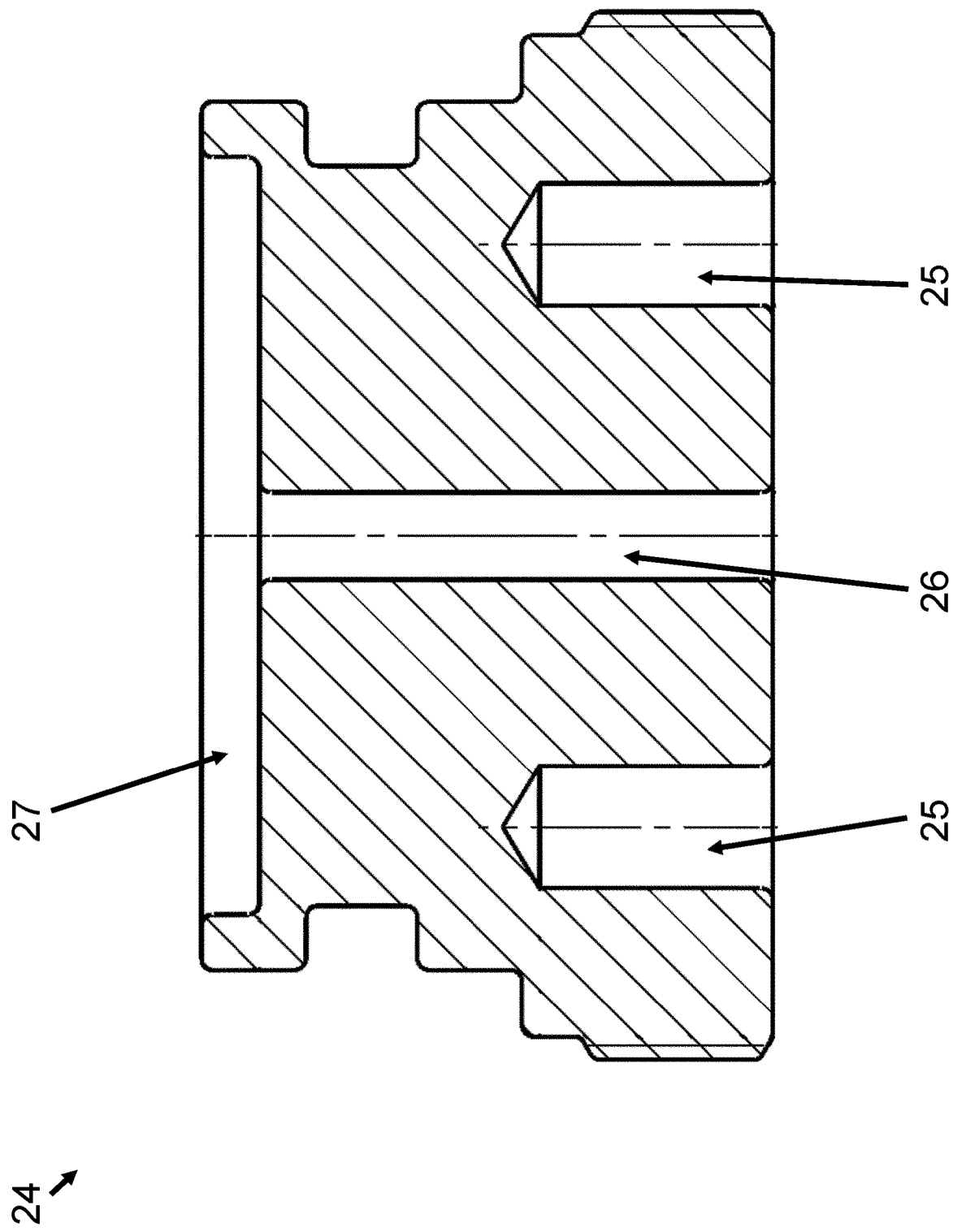
Figure 12:
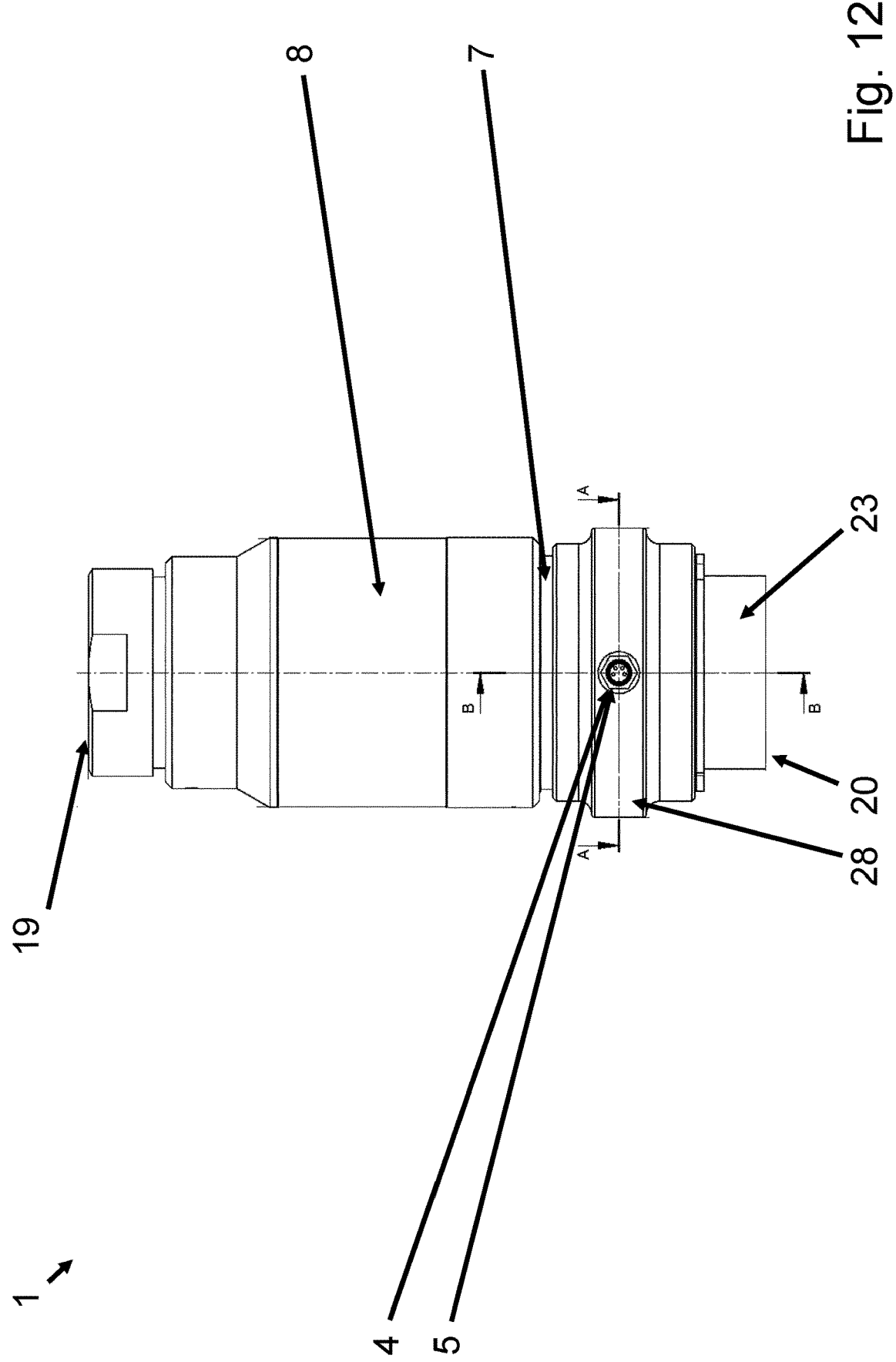
Figure 13:
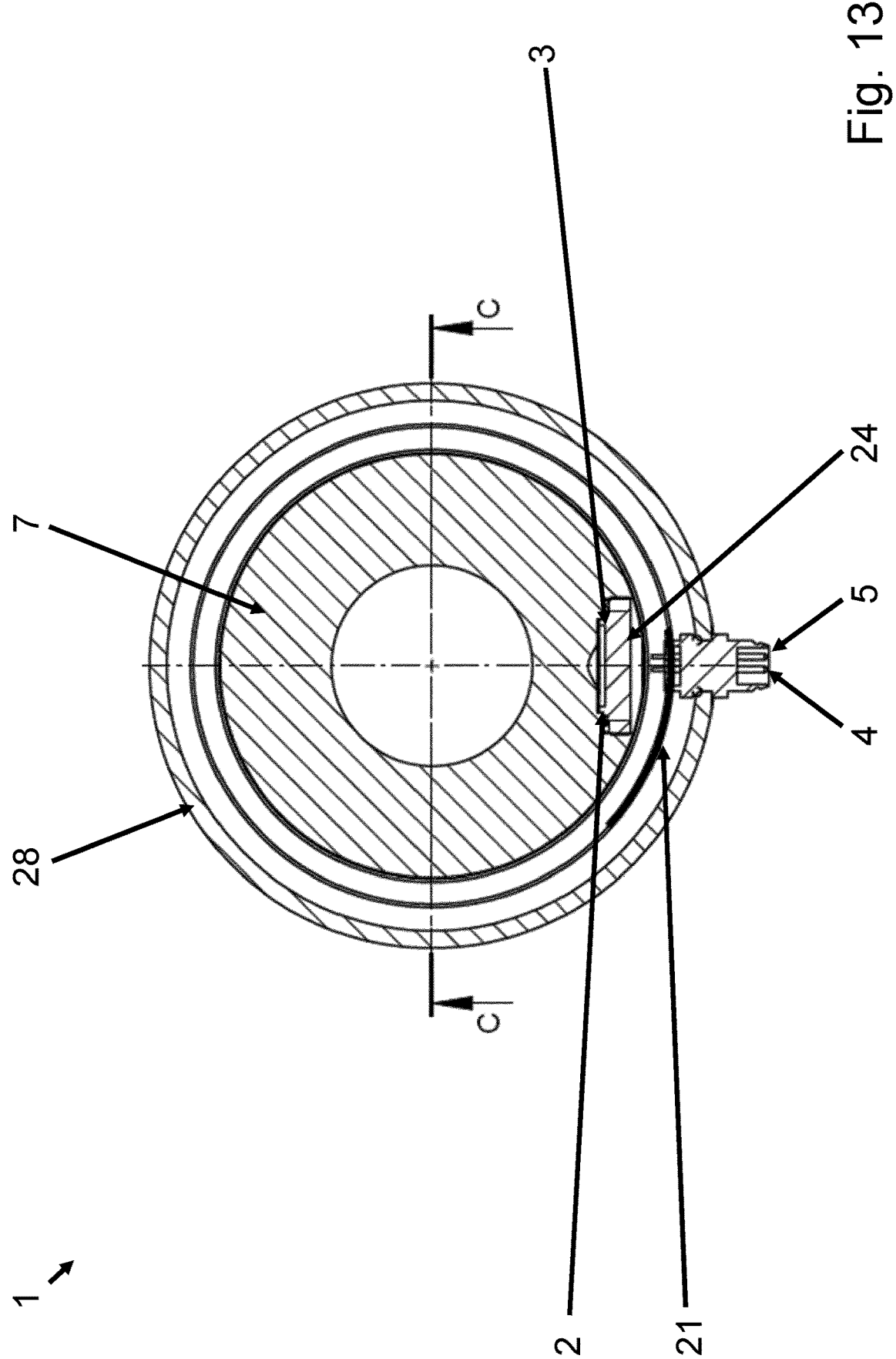
Figure 14:
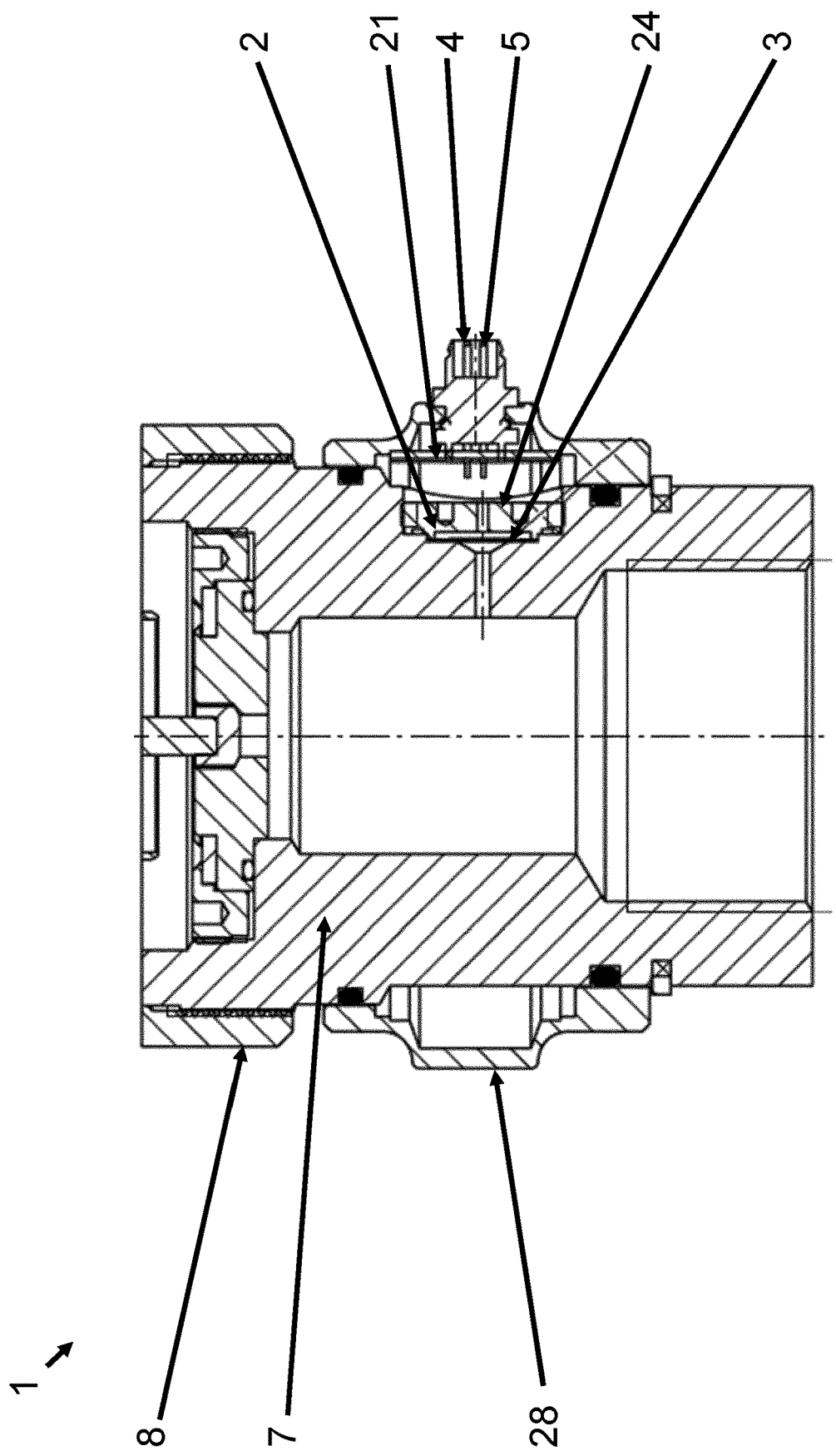
Figure 15:
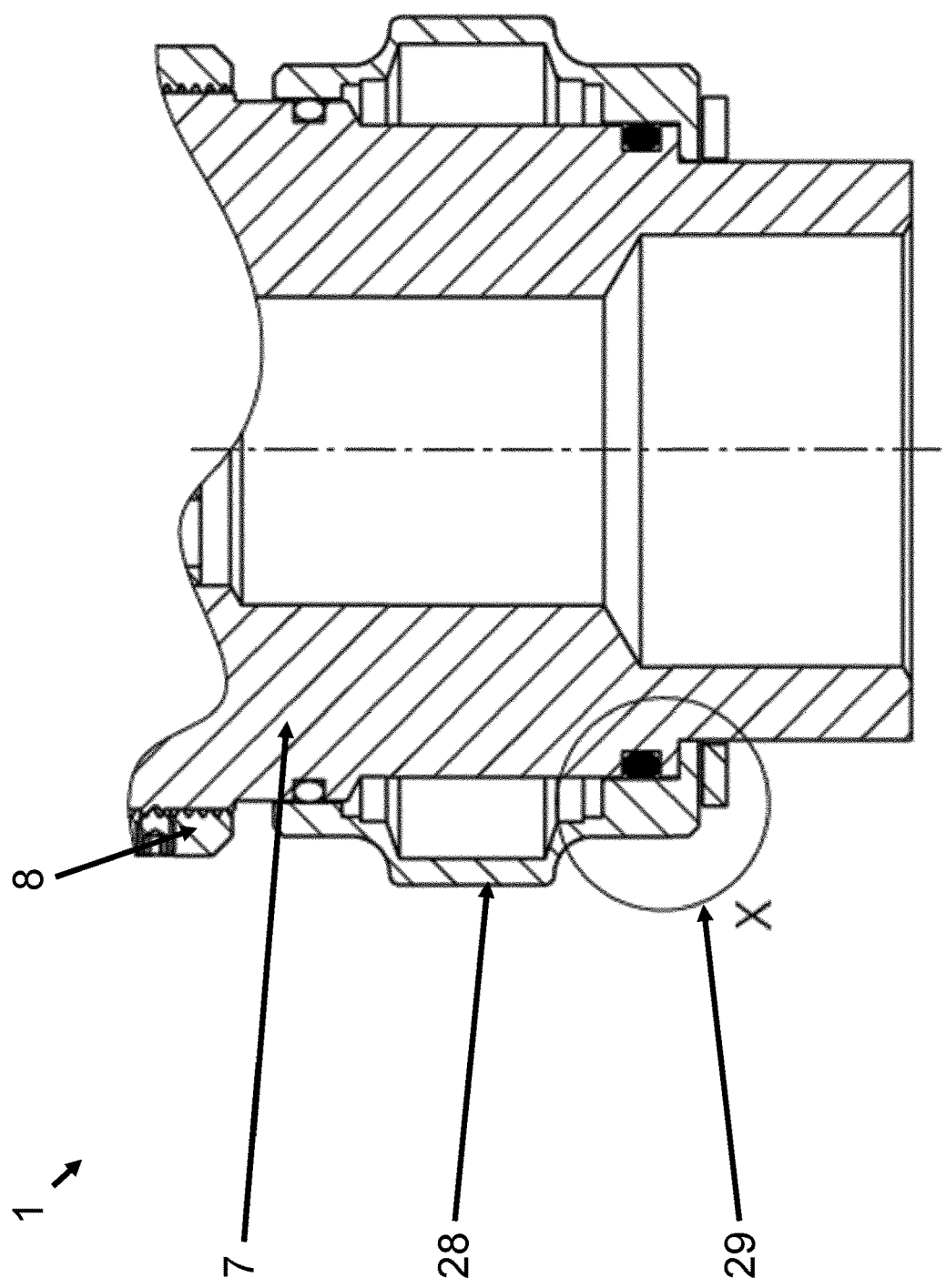
Figure 16:
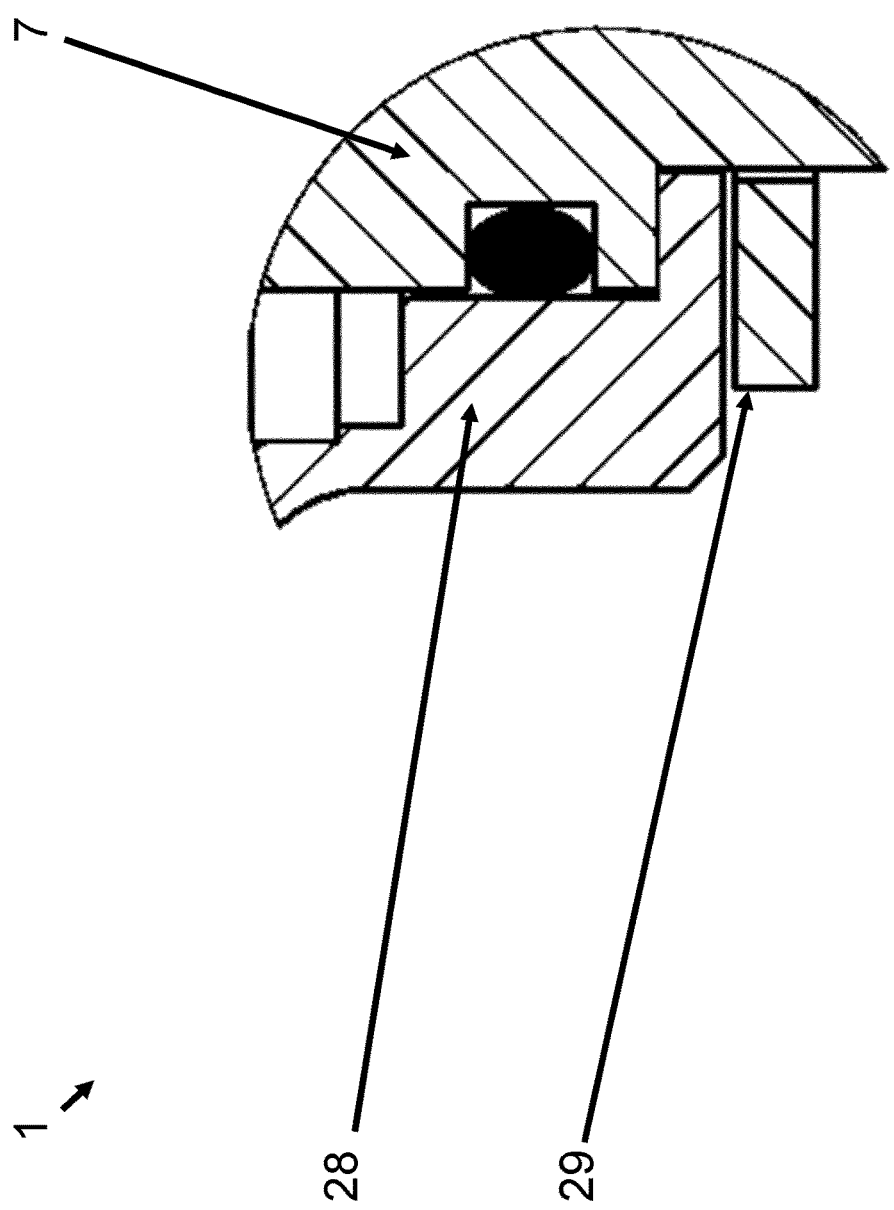
Figure 17:
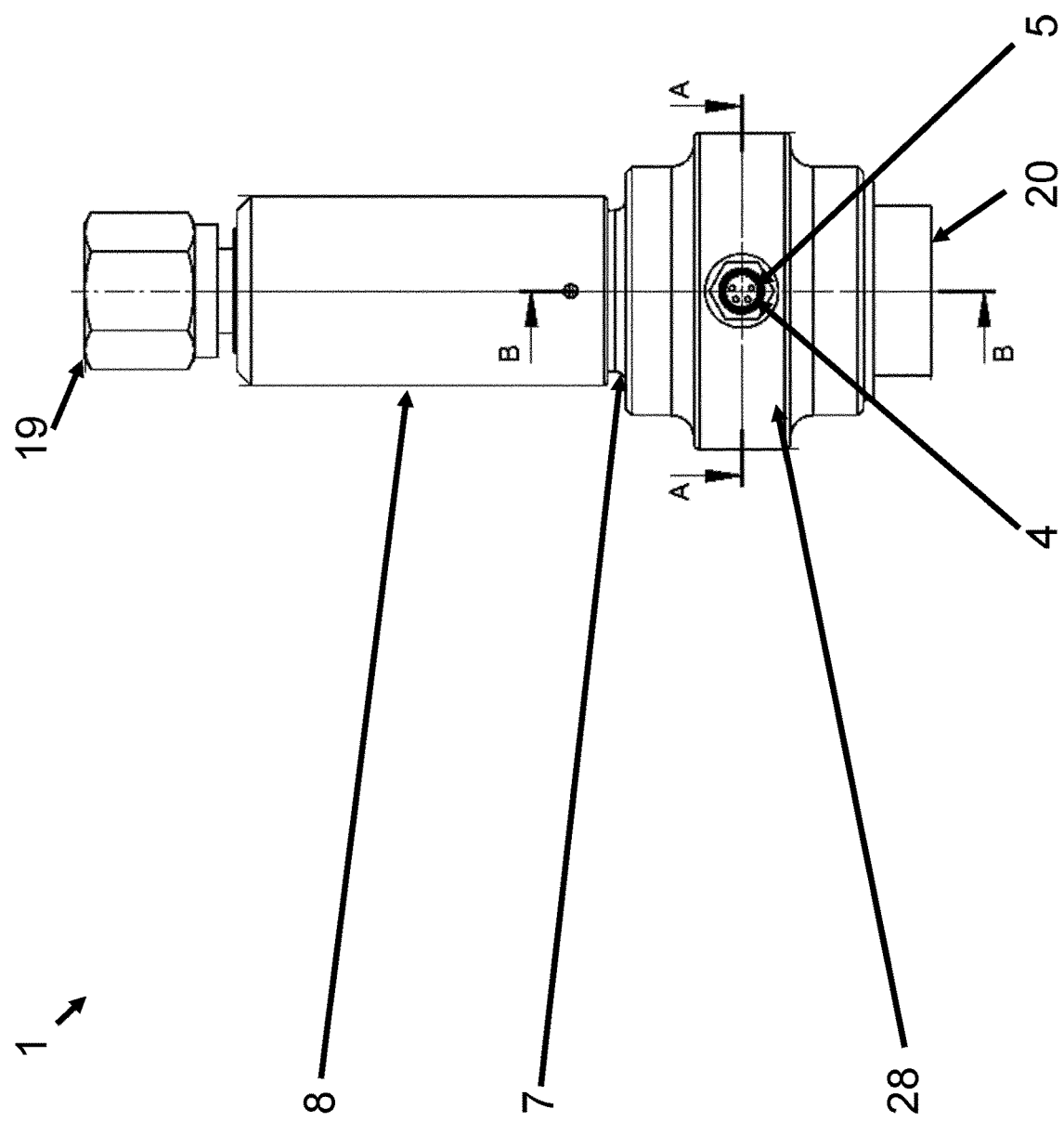
Figure 18:
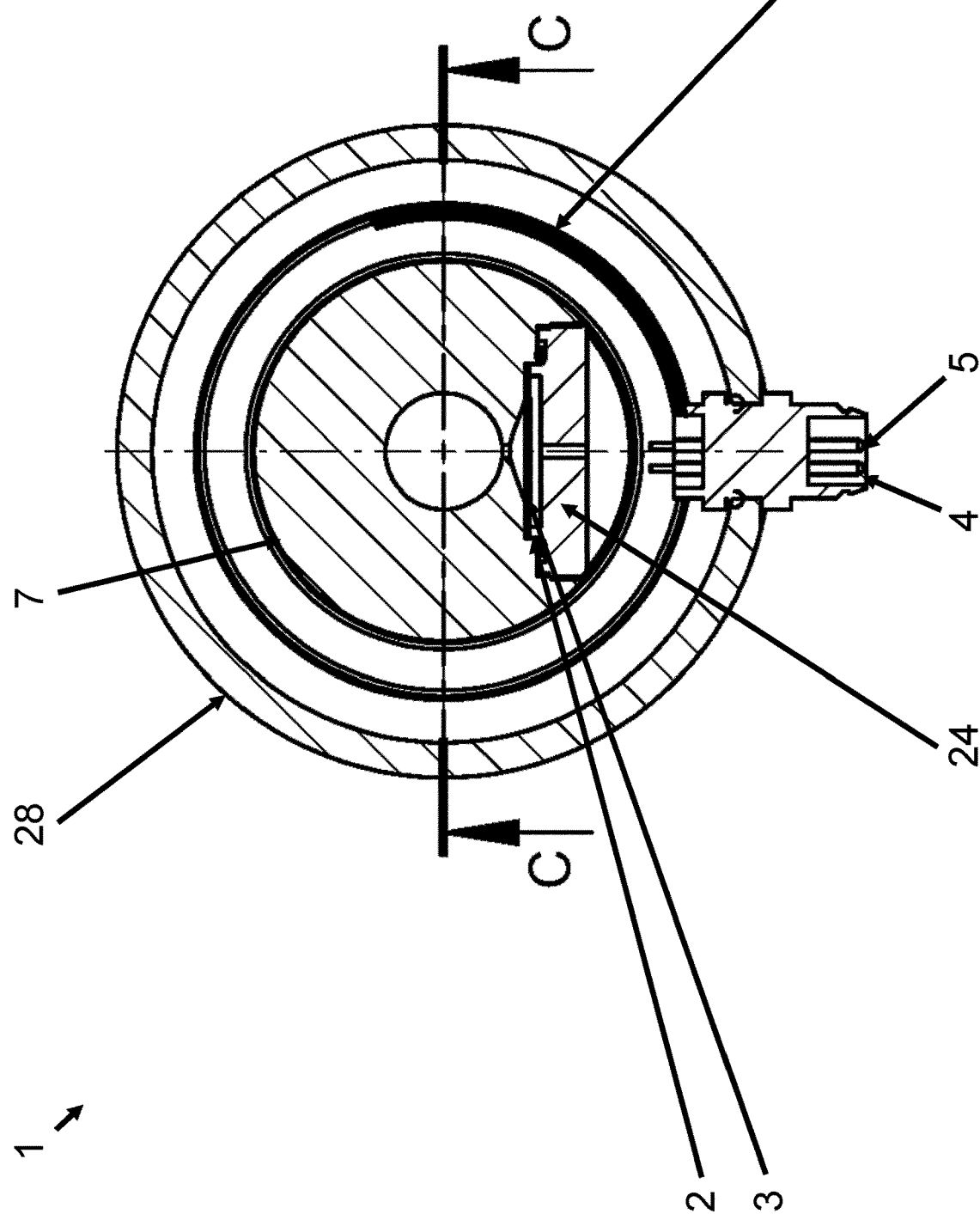
Figure 19:
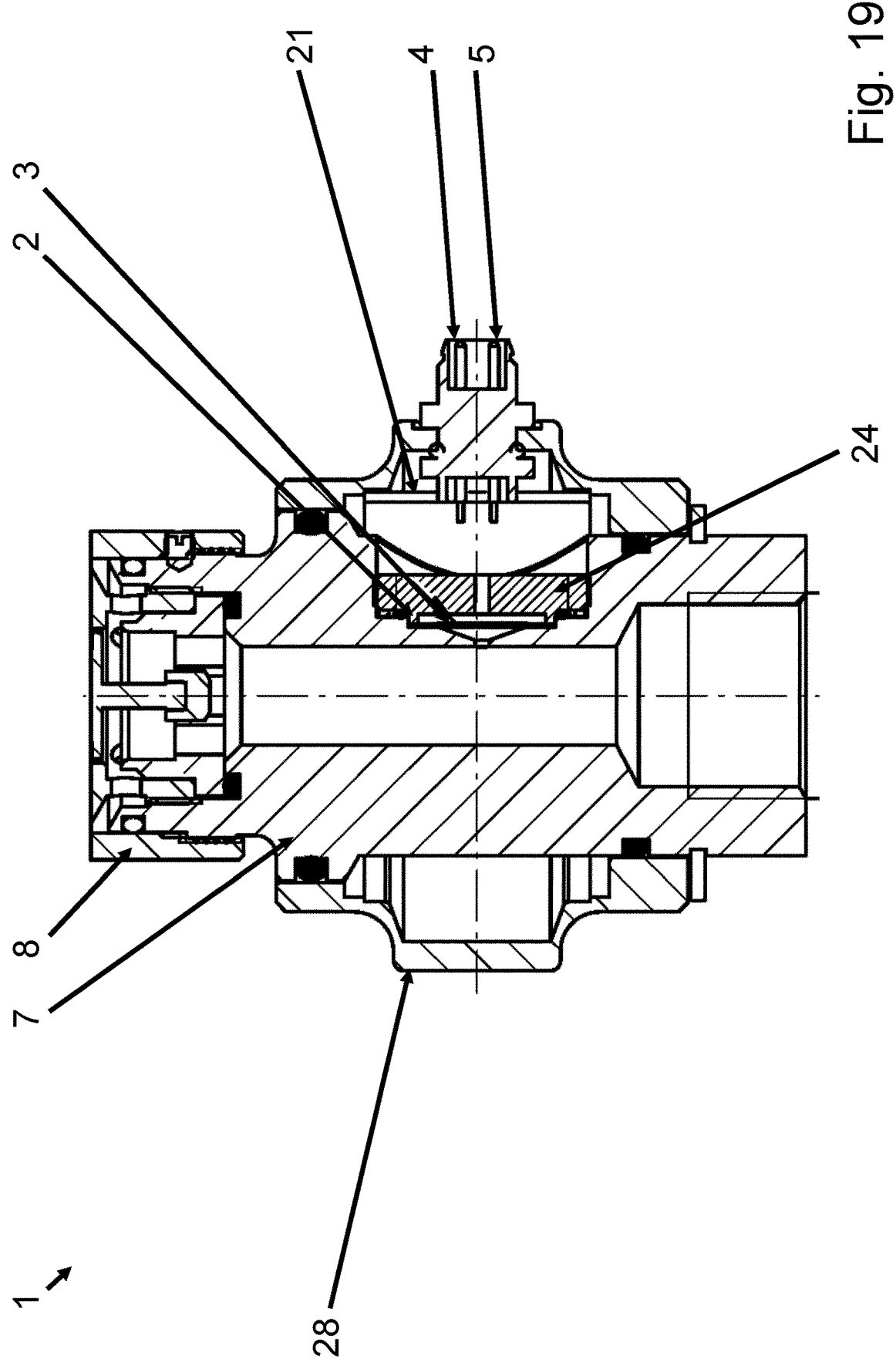
Figure 20:
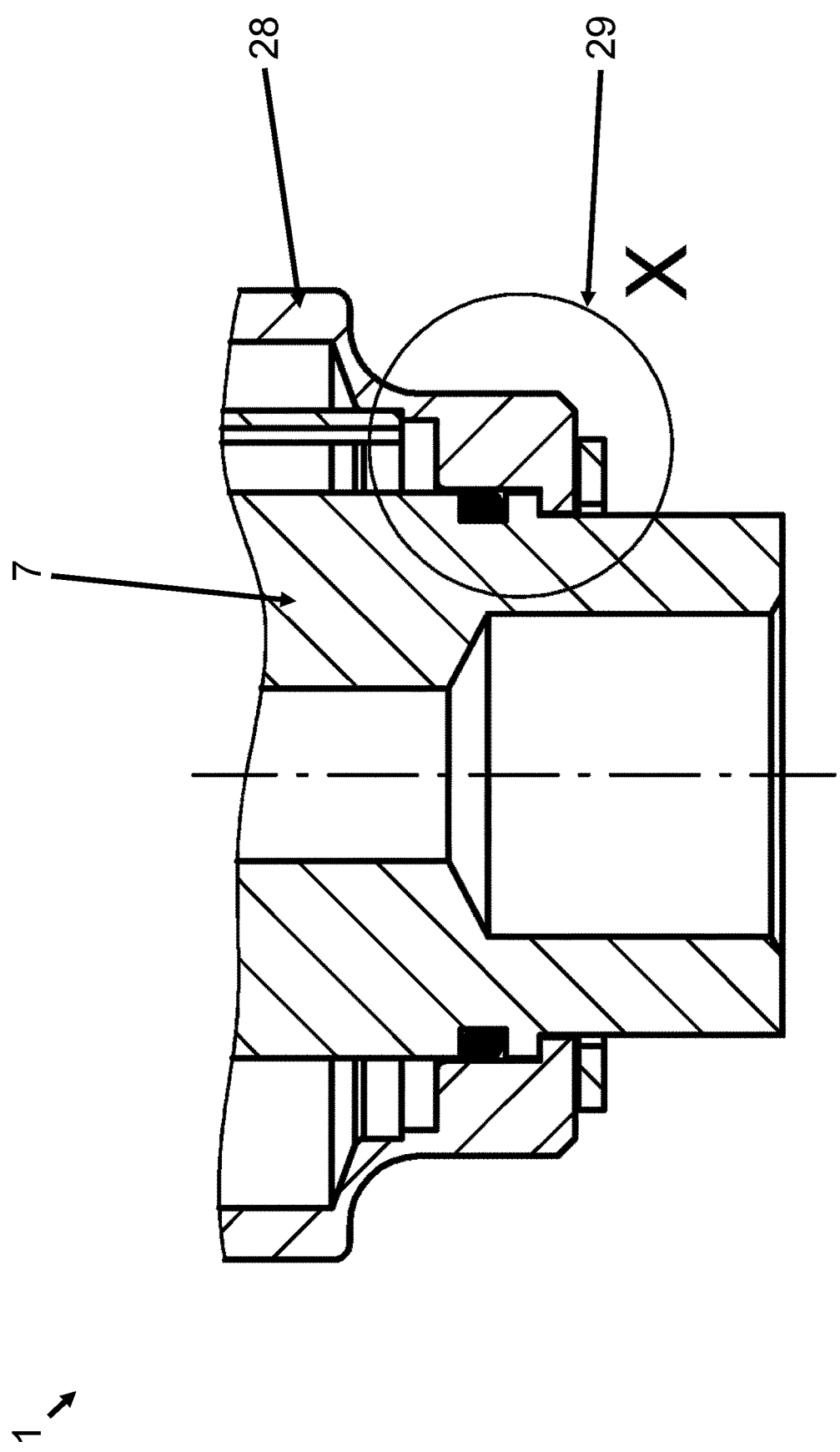
Figure 21:
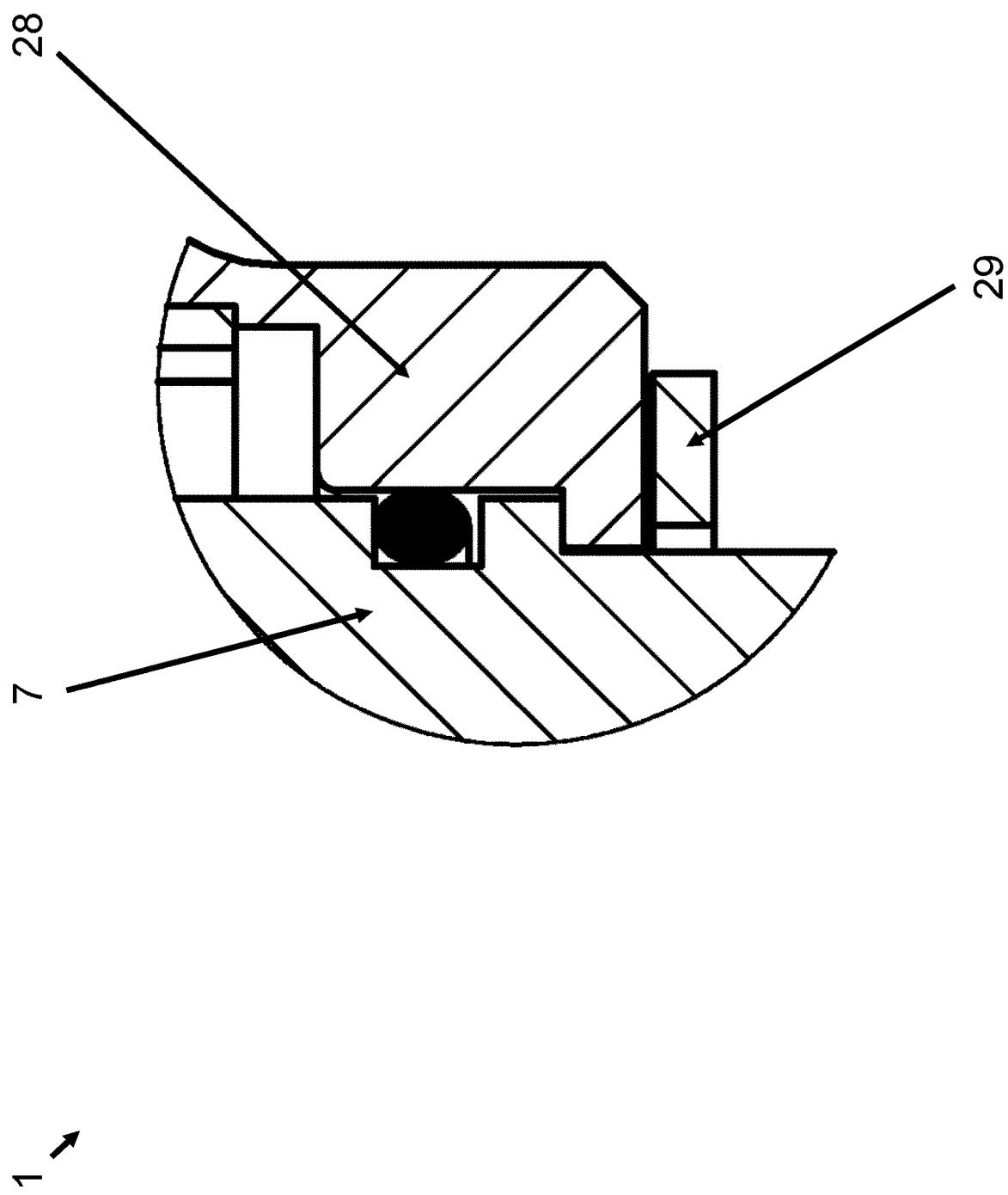

Further features, details and advantages of the invention result from the following description and the drawings. Exemplary embodiments of the invention are shown schematically in the following drawings and are described in more detail below. In the drawings:

FIG. 1: shows a schematic, perspective view of a device according to the invention according to a first embodiment, FIG. 2 shows a schematic side view of the device according to the invention according to the first embodiment, FIG. 3 shows a schematic sectional view through the device according to the invention according to the first embodiment, FIG. 4 shows a schematic view of a device according to the invention according to a second embodiment, FIG. 5 shows a schematic top view of the device according to the invention according to the second embodiment, FIG. 6 shows a schematic sectional view through the device according to the invention according to the second embodiment along the circuit board, FIG. 7 shows a schematic sectional view through the device according to the invention according to the second embodiment on the circuit board, FIG. 8 shows a schematic sectional view through the device according to the invention according to the second embodiment on the sensor device, FIG. 9 shows a schematic detailed view through the device according to the invention according to the second embodiment on the sensor device, FIG. 10 shows a schematic top view of the receptacle of the sensor device, FIG. 11 shows a schematic sectional view through the receptacle of the sensor device, FIG. 12 shows a schematic view of a device according to the invention according to a third embodiment, FIG. 13 shows a schematic sectional view through the device according to the invention according to the third embodiment along the circuit board, FIG. 14 shows a schematic sectional view through the device according to the invention according to the third embodiment on the sensor device, FIG. 15 shows a schematic sectional view through the device according to the invention according to the third embodiment on the displacement lock, FIG. 16 shows a schematic detailed view through the device according to the invention according to the third embodiment on the displacement lock, FIG. 17 shows a schematic view of a device according to the invention according to a fourth embodiment, FIG. 18 shows a schematic sectional view through the device according to the invention according to the fourth embodiment along the circuit board, FIG. 19 shows a schematic sectional view through the device according to the invention according to the fourth embodiment on the sensor device, FIG. 20 shows a schematic sectional view through the device according to the invention according to the fourth embodiment on the displacement lock, and FIG. 21 shows a schematic detailed view through the device according to the invention according to the fourth embodiment on the displacement lock.

A device according to the invention is shown in the Figures generally designated with the reference number 1. The view according to FIG. 1 shows a device 1 according to a first embodiment for preventing flashbacks into a line carrying combustible gas (not shown). The device 1 can be connected to such a gas line (not shown), so that the device 1 secures the connectable gas line. In the embodiment shown here, the device 1 comprises two adapter rings 7 that are coupled to the housing 8. Sensor devices 2 are arranged in each of these adapter rings 7.

FIG. 2 shows a side view of the device 1 shown in FIG. 1. It can clearly be seen how the adapter rings 7 are coupled to the housing 8. This view also shows a sectional plane A-A, which corresponds to the sectional view in FIG. 3.

As can be seen in FIG. 3, the device 1 comprises two adapter rings 7 screwed onto the housing 8 by means of a thread 12. An onward flow barrier 9 is arranged in the housing 8 shown. This onward flow barrier 9 is temperature-controlled and ensures that any afterburning in the gas-carrying line is extinguished. Before unacceptable heating of the device 1, the plastic melt body 18 arranged in the device 1 melts and the valve 16, 17 loaded by the spring 15 automatically releases and the valve piston 16 moves towards the valve seat 17, thus interrupting the gas supply. This prevents a critical ignition temperature from forming on the gas inlet side 19 of the device 1. The gas non-return valve 10 arranged in the housing 8 engages when gas flows back through the line. Such a backflow is stopped by the valve 13 loaded by the spring 14 to prevent the formation of an explosive gas mixture. The spring 14 stops the backflow by moving the valve plate 13 in the direction of the gas inlet side 19. A flashback is prevented by the sintered body 11 made of sintered chromium-nickel steel and designed as a hollow cylinder. The highly porous structure of the sintered body 11 ensures that incoming flames branch out in a labyrinth of pores, lose their energy and cool down so that the flame goes out. The adapter rings 7 shown in FIG. 3 are coupled to the housing 8 and each have a sensor device 2 which captures and stores the frequency and intensity of flashbacks. For capturing, the sensor device 2 has at least one sensor 3, which can be designed as a temperature sensor, pulse sensor, sound sensor, pressure sensor and/or piezo element. In addition, FIG. 3 shows a light-emitting diode 4 designed as a light ring, which serves as an indicator to signal flashbacks that have occurred. In addition, the light-emitting diode 4 shown here serves as an interface for transmitting captured and stored data from the sensor device 2. An interface designed as a photoelement 5 also enables communication with an external device, in particular a tablet or smartphone. The sensor device 2 can be configured and/or reset via this interface. A further possibility would be a radio interface (e.g., NFC, Bluetooth, etc.) via which data from the sensor device 2 can be read or exchanged. Depending on the embodiment, the sensor device 2 can log entire series of measurements or record other events that are of particular interest. The sensor device 2 is preferably connected to a primary cell (not shown) and is operated via this primary cell. The primary cell is advantageously securely built into the device 1, further advantageously securely built into the adapter ring 7.

In order to delay the replacement of the device 1 or the adapter ring 7 for as long as possible after the discharge of the primary cell, mainly passive sensor elements are used, so that the power supply of the sensor device 2 can be carried out with the fixed primary cell over a longer period of time. The secure installation of the primary cell ensures high functionality and prevents errors caused by incorrect, subsequent insertion of a replaceable primary cell.

The view according to FIG. 4 shows a device 1 according to a second embodiment for preventing flashbacks into a line carrying combustible gas (not shown). The device 1 can be connected to such a gas line so that the device 1 secures the connectable gas line. In the embodiment shown here, the device 1 comprises an adapter ring 7 that is coupled to the housing 8. The sensor device 2 is arranged in this adapter ring 7. The sensor device 2 is accessible for maintenance, repair or replacement via an inspection opening covered by a cover 22. The illustrated device 1 is shown in a side view from the outside. For the internal structure in the housing 8 of the device 1 shown in FIG. 4, see also FIG. 3. The view according to FIG. 4 also shows a sectional plane A-A, which corresponds to the sectional view in FIG. 6. The view also shows a sectional plane B-B, which corresponds to the sectional view in FIG. 7. The sectional plane C-C indicates the section through the device 1 for FIG. 8.

FIG. 5 shows a top view of the device 1 according to FIG. 4, so that the valve plate 13 can be seen.

FIG. 6 illustrates a sectional view according to the sectional plane A-A from FIG. 4 through the adapter ring 7 of the device 1. The adapter ring 7 has a sensor device 2 which captures and stores the frequency and intensity of flashbacks. For capturing, the sensor device 2 has at least one sensor 3, which can be designed as a temperature sensor, pulse sensor, sound sensor, pressure sensor and/or piezoelectric element. In addition, FIG. 6 shows a light-emitting diode 4, which serves as an indicator to signal flashbacks that have occurred. In addition, the light-emitting diode 4 shown here serves as an interface for transmitting captured and stored data from the sensor device 2. An interface designed as a photoelement 5 also enables communication with an external device, in particular a tablet or smartphone. The sensor device 2 can be configured and/or reset via this interface. A further possibility would be a radio interface (e.g., NFC, Bluetooth, etc.) via which data from the sensor device 2 can be read or exchanged. Depending on the embodiment, the sensor device 2 can log entire series of measurements or record other events that are of particular interest. The sensor device 2 is preferably connected to a primary cell (not shown) and is operated via this primary cell. The primary cell is advantageously securely built into the device 1, further advantageously securely built into the adapter ring 7. In order to delay the replacement of the device 1 or the adapter ring 7 for as long as possible after the discharge of the primary cell, mainly passive sensor elements are used, so that the power supply of the sensor device 2 can be carried out with the fixed primary cell over a longer period of time. The secure installation of the primary cell ensures high functionality and prevents errors caused by incorrect, subsequent insertion of a replaceable primary cell. As can be seen in FIG. 6, the device 1 comprises a circuit board 21 which is connected to the sensor device 2 and the interface. This circuit board 21 is advantageously curved in the shape of a circular arc and is arranged along the circumference of the adapter ring 7. Such a curved circuit board 21 allows a particularly space-saving integration into the adapter ring 7.

FIG. 7 shows the adapter ring 7 coupled to the housing 8 in a schematic sectional view through the circuit board 21. Furthermore, it can be seen that a connection adapter 23 is screwed into the adapter ring 7 for connecting the device 1 to the line carrying the combustible gas via a thread.

FIG. 8 shows a schematic sectional view through the device 1 according to the invention according to the sectional plane C-C in FIG. 4 on the sensor device 2. In the exemplary embodiment, the sensor device 2 is received in a receptacle 24 which is screwed into the adapter ring 7. Preferably, the sensor device 2 in the exemplary embodiment is designed as a pressure and temperature sensor or piezoelectric element 3.

FIG. 9 illustrates a detailed view of the receptacle 24 according to FIG. 8 for the sensor device 2. It can be seen that the sensor 3 is fixed by the receptacle 24 of the sensor device 2 by screwing it into the adapter ring 7. The sensor 3 in the adapter ring 7 can be replaced quickly and easily via this screw connection.

FIG. 10 shows a schematic top view of the receptacle 24 of the sensor device 2. Adapter bores 25 can be seen, via which the receptacle 24 can be screwed into and out of the adapter ring 7 using a special tool. In addition, a feed-through 26 can be seen for the cabling of the sensor 3 (FIG. 9).

In FIG. 11, which shows a schematic sectional view through the receptacle 24 of the sensor device 3 according to FIG. 10, it can be seen that the feed-through 26 extends from the sensor receptacle 27 through the receptacle 24 for the sensor device.

The views according to FIGS. 12 and 17 show a device 1 according to a third or fourth embodiment for preventing flashbacks into a line carrying combustible gas (not shown). The devices 1 can be connected to such a gas line so that the devices 1 secure the connectable gas line. In the third embodiment shown according to FIGS. 12 to 16 and in the fourth embodiment shown according to FIGS. 17 to 21, the device 1 respectively comprises an adapter ring 7 coupled to the housing 8. The sensor device 2 is arranged in this adapter ring 7. The device 1 shown in FIGS. 12 and 17 is shown in a side view from the outside. For the internal structure in the housing 8 of the device 1 shown, reference is also made to FIG. 3. In the views according to FIGS. 12 and 17, a sectional plane A-A is also shown, which corresponds to the sectional view in FIG. 13 or FIG. 18. The view in FIG. 12 or 17 also shows a sectional plane B-B, which corresponds to the sectional view in FIG. 14 or 19. The sectional plane C-C indicates the section through the device according to FIG. 12 or 17 for FIG. 15 or 20.

FIGS. 13 and 18 represent a sectional view according to the sectional plane A-A from FIG. 12 or 17 through the adapter ring 7 of the respective device 1. The adapter ring 7 has a sensor device 2 in both the third and the fourth embodiment which captures and stores the frequency and intensity of flashbacks. For capturing, the sensor device 2 has at least one sensor 3, which can be designed as a temperature sensor, pulse sensor, sound sensor, pressure sensor and/or piezoelectric element. In addition, FIGS. 13 and 18 show a light-emitting diode 4, which serves as an indicator to signal flashbacks that have occurred. In addition, the light-emitting diode 4 shown here respectively serves as an interface for transmitting captured and stored data from the sensor device 2. An interface designed as a photoelement 5 also enables communication with an external device, in particular a tablet or smartphone. The sensor device 2 can be configured and/or reset via this interface. A further possibility would be a radio interface (e.g., NFC, Bluetooth, etc.) via which data from the sensor device 2 can be read or exchanged. Depending on the embodiment, the sensor device 2 can log entire series of measurements or record other events that are of particular interest. The sensor device 2 is preferably connected to a primary cell (not shown) and is operated via this primary cell. The primary cell is advantageously securely built into the device 1, further advantageously securely built into the adapter ring 7. In order to delay the replacement of the device 1 or the adapter ring 7 for as long as possible after the discharge of the primary cell, mainly passive sensor elements are used, so that the power supply of the sensor device 2 can be carried out with the fixed primary cell over a longer period of time. The secure installation of the primary cell ensures high functionality and prevents errors caused by incorrect, subsequent insertion of a replaceable primary cell. As can be seen in FIGS. 13 and 18, the device 1 in the embodiments shown respectively comprises a circuit board 21 which is connected to the sensor device 2 and the interface. This circuit board 21 is advantageously curved in the shape of a circular arc and is arranged along the circumference of the adapter ring 7. Such a curved circuit board 21 allows a particularly space-saving integration into the adapter ring 7.

FIGS. 14 and 19 each show a schematic sectional view through the device 1 according to the invention according to the third and fourth embodiments according to the sectional plane C-C in FIG. 12 or 17 on the sensor device 2. In the exemplary embodiments, the sensor device 2 is received in a receptacle 24 which is screwed into the adapter ring 7. Preferably, the sensor device 2 in the exemplary embodiments is designed as a pressure and temperature sensor or piezoelectric element 3. It can be seen that the sensor 3 is fixed by the receptacle 24 of the sensor device 2 by screwing it into the adapter ring 7. The sensor 3 in the adapter ring 7 can be replaced quickly and easily via this screw connection.

FIG. 15 shows a schematic sectional view through the device 1 according to the third embodiment, while FIG. 20 shows a sectional view through the device 1 according to the fourth embodiment. In both views it can be seen that a cover ring 28 is respectively arranged on the adapter ring 7, which cover ring protects the sensor device 2 and the circuit board 21. This cover ring 28 is secured against relative displacement by a displacement lock 29 on the adapter ring 7.

In both FIG. 16 and FIG. 21, a detailed view of this displacement lock 29 is shown in the third and fourth embodiments of the device 1 according to the invention.

LIST OF REFERENCE CHARACTERS

1 Device, flame trap
2 Sensor device
3 Sensor
4 Light-emitting diode
5 Photoelement
6 External device
7 Adapter ring
8 Housing
9 Onward flow barrier
10 Gas non-return valve
11 Sintered body
12 Thread
13 Valve plate
14 Pressure spring A
15 Pressure spring B
16 Valve piston
17 Valve insert
18 Melt body
19 Gas inlet side
20 Gas outlet side
21 Circuit board
22 Cover
23 Connection adapter
24 Receptacle of the sensor device
25 Adapter bores
26 Feed-through
27 Sensor receptacle
28 Cover ring
29 Displacement lock

The invention claimed is:

1. Device for preventing flashback in a pipe carrying a flammable gas, more particularly a flame trap, wherein the device has a housing, with at least one onward flow barrier disposed therein, at least one gas non-return valve disposed therein and at least one sintered body disposed therein, wherein the device comprises a sensor device, and wherein the sensor device captures and stores data that characterizes the frequency and intensity of flashbacks.

2. Device according to claim 1, wherein the sensor device has at least one sensor designed as a temperature sensor, pulse sensor, sound sensor, pressure sensor and/or piezoelectric element.

3. Device according to claim 1, wherein the sensor device transmits the captured and/or stored data by means of an interface.

4. Device according to claim 3, wherein the interface has a light-emitting diode.

5. Device according to claim 3, wherein the interface has a photoelement.

6. Device according to claim 3, wherein the interface communicates with an external device comprises a tablet or a smartphone.

7. Device according to claim 3, wherein the interface communicates with a cloud service.

8. Device according to claim 3, wherein the interface is designed as a mesh component and designed to be integrated into a mesh network.

9. Device according to claim 3, wherein the sensor device can be configured and/or reset via the interface.

10. Device according to claim 1, wherein the sensor device is arranged in an adapter ring.

11. Device according to claim 10, wherein the adapter ring can be coupled to the housing.

12. Device according to claim 10, wherein the device has a plurality of adapter rings.

13. Device according to claim 1, wherein the sensor device is arranged in the housing.

14. Device according to claim 1, wherein the device has a flowmeter that is designed to monitor the permeability of the sintered body.

15. A device for preventing flashback, the device comprising:
   a housing with a gas inlet side and a gas outlet side, wherein a sintered body and an onward flow barrier are disposed within the housing between the gas inlet side and the gas outlet side; and
   a sensor device to capture and store data that characterizes the frequency and intensity of flashbacks.

16. The device of claim 15, further comprising an adapter ring coupled to the housing, the sensor device arranged in the adapter ring.

17. The device of claim 15, further comprising a cover ring arranged on an adapter ring that is coupled to the sensor device.

18. The device of claim 17, further comprising a displacement lock to secure the cover ring against displacement relative to the adapter ring.

19. The device of claim 15, further comprising a flow meter to monitor permeability of the sintered body.

20. The device of claim 15, wherein the housing is coupled to an adapter ring, and the sensor device is received in a receptacle that is screwed into the adapter ring.

* * * * *